(No Model.)

W. JONES.
CHILD'S CARRIAGE.

No. 413,802. Patented Oct. 29, 1889.

Witnesses—
Jason M. Walker
Geo. A. Laine

Inventor—
Washington Jones
by Wm. R. Gerhart
His Atty.

UNITED STATES PATENT OFFICE.

WASHINGTON JONES, OF LANCASTER, PENNSYLVANIA.

CHILD'S CARRIAGE.

SPECIFICATION forming part of Letters Patent No. 413,802, dated October 29, 1889.

Application filed July 9, 1889. Serial No. 316,947. (No model.)

*To all whom it may concern:*

Be it known that I, WASHINGTON JONES, a citizen of the United States, residing in Lancaster, in the county of Lancaster and State of Pennsylvania, have invented certain Improvements in Children's Carriages, of which the following is a specification.

My invention relates to improvements in that class of children's carriages which are propelled by hand; and the object of my improvement is to automatically brake the wheels of the carriage by releasing the handhold of the propeller-bar. I accomplish this object by the mechanism illustrated in the accompanying drawings, in which—

Figure 1:
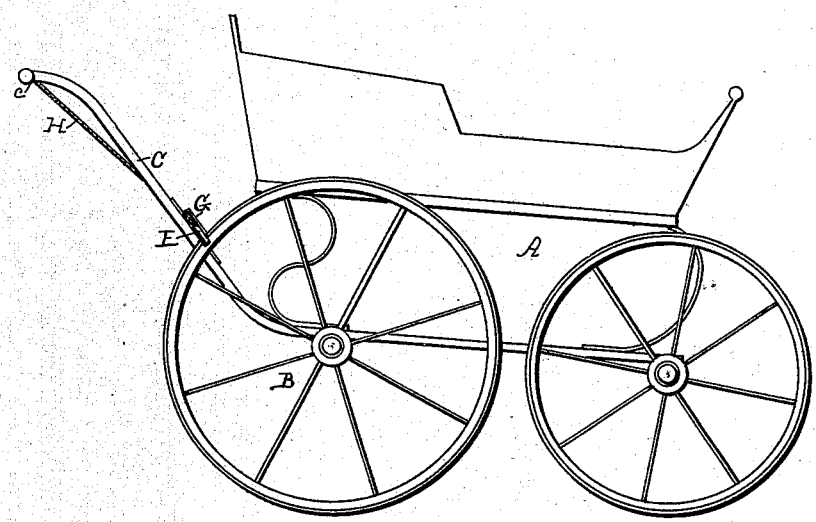
Figure 2:
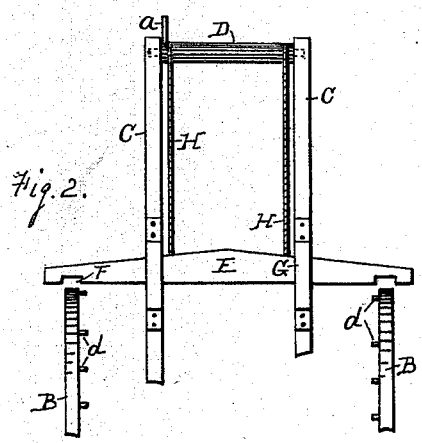
Figure 3:
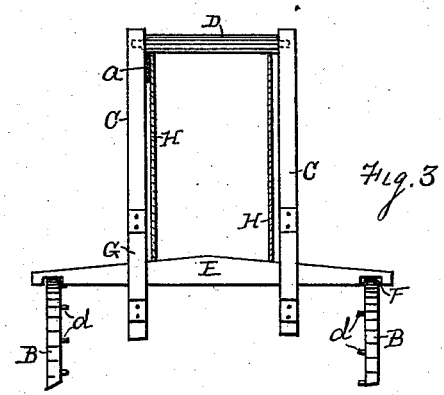

Figure 1 is a side elevation of a child's carriage embodying my invention; Fig. 2, a front view of the handles, showing the brake disengaged from the wheels; and Fig. 3, a similar view showing the brake in engagement with the wheels.

Similar letters indicate like parts throughout the several views.

In the drawings, A represents the carriage; B, the hind wheels; C, the handles, and D the propeller-bar journaled in the end c of the handles. Stretched across the front of the handles and resting thereon, over the rear part of the hind wheels, there is a brake-bar E, provided with notches F, adapted to receive the tire and fellies of the wheels B when the brake rests upon them. The brake is held in place by elongated staples G, bolted to the handles, in which it is movable toward and from the wheels. The propeller-bar is journaled in the ends of the handles C, and is provided with a handle a, by which it is revolved in its bearings. Cords H connect the brake and the propeller-bar, and are so attached to the latter that when it is revolved by the handle they are wound about it and the brake drawn away from the wheels. When the brake rests upon the wheels, the tire and fellies are received in the notches F, the sides thereof engaging short studs d on the inner faces of the fellies.

The operation of this brake is very simple. Normally the brake is in engagement with the wheels; but when it is desirable to move the carriage the propeller-bar is given a half-revolution with the handle, that being sufficient to clear the brake from the wheels, and is then grasped by the hands, the pressure of which prevents the turning of the propeller-bar. By removing the hands from the propeller-bar the brake slides down the handles C, by reason of its own weight, and engages the wheels, the contact of the studs d with the sides of the notches F stopping the revolution of the same.

Having thus described my invention, what I claim as new, and desire to secure by Letters Patent, is—

1. In a child's carriage, the combination of studs projecting from the sides of the wheels, and a brake adapted to engage said studs, substantially as specified.

2. The combination, with the brake constructed to engage and lock the wheels, of cords connecting the brake and propeller-bar, the propeller-bar journaled in the handles C, and a handle a, adapted to revolve the propeller-bar in its journals and wrap the cords around it to disengage the brake from the wheels, substantially as specified.

3. The combination, with the wheels provided with studs d, of the brake constructed to engage said studs, connections between the brake and propeller-bar, and the propeller-bar adapted to disengage the brake from the studs, substantially as specified.

4. In a child's carriage, the combination, with the propeller-bar journaled in the handles thereof, of a brake movably secured to the handles and provided with notches adapted to take over the rims of the wheels, studs d on the rims of the wheels, and cords connecting the brake and propeller-bar, substantially as and for the purpose specified.

5. In a child's carriage, the combination, with a brake constructed to slide up and down on the handles and held in engagement with the wheels by gravity, of staples, in which the brake slides, secured to the handles, and connections for disengaging the brake from the wheels, substantially as specified.

WASHINGTON JONES.

Witnesses:
JACOB HALBACH,
WM. R. GERHART.